United States Patent [19]
Kocher

[11] Patent Number: 5,779,832
[45] Date of Patent: Jul. 14, 1998

[54] METHOD AND APPARATUS FOR MAKING A PEELABLE FILM

[75] Inventor: Patrick N. Kocher, Greer, S.C.

[73] Assignee: W. R. Grace & Co.-Conn., Duncan, S.C.

[21] Appl. No.: 756,205

[22] Filed: Nov. 25, 1996

[51] Int. Cl.⁶ .............. B32B 31/18; B32B 31/22
[52] U.S. Cl. .............. 156/73.1; 156/152; 156/252; 156/272.6; 156/308.2
[58] Field of Search .............. 156/73.1, 152, 156/252, 272.6, 308.2, 379.6, 380.7, 497, 513, 514, 582

[56] References Cited

U.S. PATENT DOCUMENTS

| | | | |
|---|---|---|---|
| 1,042,119 | 10/1912 | Kavanagh . | |
| 2,260,064 | 10/1941 | Stokes | 93/3 |
| 2,623,826 | 12/1952 | Grinstead | 99/174 |
| 2,814,381 | 11/1957 | Stevick | 206/45 |
| 2,925,346 | 2/1960 | Harper et al. | 99/174 |
| 3,019,573 | 2/1962 | Navikas | 53/27 |
| 3,074,798 | 1/1963 | Palmer | 99/174 |
| 3,245,855 | 4/1966 | Stenvall | 156/152 |
| 3,360,382 | 12/1967 | Miller | 99/174 |
| 3,561,668 | 2/1971 | Bergstrom | 229/43 |
| 3,574,642 | 4/1971 | Weinke | 99/174 |
| 3,681,092 | 8/1972 | Titchenal et al. | 99/174 |
| 3,684,603 | 8/1972 | Iltis | 156/152 |
| 3,713,849 | 1/1973 | Grindrod et al. | 99/174 |
| 3,716,180 | 2/1973 | Bemiss et al. | 299/13 |
| 3,783,089 | 1/1974 | Hurst et al. | 161/166 |
| 3,808,394 | 4/1974 | Mominee et al. | 219/121 |
| 3,843,806 | 10/1974 | Kishpaugh et al. | 426/106 |
| 4,055,672 | 10/1977 | Hirsch et al. | 426/127 |
| 4,264,392 | 4/1981 | Watt | 156/272 |
| 4,438,850 | 3/1984 | Kahn | 206/634 |
| 4,522,835 | 6/1985 | Woodruff et al. | 426/264 |
| 4,590,078 | 5/1986 | Umina | 426/113 |
| 4,634,614 | 1/1987 | Holzner | 428/35 |
| 4,667,814 | 5/1987 | Wakamatsu et al. | 206/0.7 |
| 4,700,531 | 10/1987 | Hsu et al. | 53/412 |
| 4,840,271 | 6/1989 | Garwood | 206/213 |
| 4,842,875 | 6/1989 | Anderson | 426/118 |
| 4,847,148 | 7/1989 | Schirmer | 428/332 |
| 4,867,821 | 9/1989 | Morgan | 156/152 |
| 4,886,372 | 12/1989 | Greengrass et al. | 383/100 |
| 4,886,690 | 12/1989 | Davis et al. | 428/36.6 |
| 4,889,731 | 12/1989 | Williams, Jr. | 426/106 |
| 4,910,033 | 3/1990 | Bekele et al. | 426/129 |
| 5,045,331 | 9/1991 | Antoon, Jr. | 426/118 |
| 5,079,059 | 1/1992 | Wyslotsky | 428/43 |
| 5,132,151 | 7/1992 | Graney | 428/40 |
| 5,226,531 | 7/1993 | Garwood | 206/213 |
| 5,296,291 | 3/1994 | Mueller | 428/349 |
| 5,348,752 | 9/1994 | Gorlich | 426/129 |
| 5,402,622 | 4/1995 | Stockley, III et al. | 53/427 |

(List continued on next page.)

FOREIGN PATENT DOCUMENTS

| | | |
|---|---|---|
| 0 261 930 | 9/1987 | European Pat. Off. . |
| 0 270 764 | 10/1987 | European Pat. Off. . |
| 0 698 563 A1 | 8/1995 | European Pat. Off. . |
| 2 323 594 | 9/1975 | France . |
| 2 240 234 | 8/1972 | Germany . |
| 2 251 540 | 1/1991 | United Kingdom . |
| 87/02965 | 11/1985 | WIPO . |

*Primary Examiner*—Richard Crispino
*Attorney, Agent, or Firm*—Mark B. Quatt

[57] ABSTRACT

A method of making a peelable film comprises providing a multilayer film; delaminating the film into a first portion and a second portion; treating the second portion to increase its gas permeability; and relaminating the treated second portion to the first portion. In another aspect of the invention, an apparatus for making a peelable film comprises a means for delaminating a film into a first portion and a second portion; a means for treating the second portion to increase its gas permeability; and a means for relaminating the treated second portion to the first portion. Perforations, partial perforations, and other film treatments can be thus advantageously utilized in connection with a second, preferably gas permeable portion of a peelable film, without affecting a first, preferably gas impermeable portion of the same film.

8 Claims, 2 Drawing Sheets

U.S. PATENT DOCUMENTS

| | | | |
|---|---|---|---|
| 5,419,096 | 5/1995 | Gorlich | 53/432 |
| 5,419,097 | 5/1995 | Gorlich et al. | 53/432 |
| 5,439,132 | 8/1995 | Gorlich | 220/359 |
| 5,492,705 | 2/1996 | Porchia et al. | 426/106 |
| 5,518,790 | 5/1996 | Huber et al. | 428/35.2 |
| 5,541,011 | 7/1996 | Takashige et al. | 428/213 |
| 5,554,250 | 9/1996 | Dais et al. | 156/353 |
| 5,558,930 | 9/1996 | DiPoto | 428/216 |
| 5,560,182 | 10/1996 | Garwood | 53/432 |

METHOD AND APPARATUS FOR MAKING A PEELABLE FILM

BACKGROUND OF THE INVENTION

The present invention relates generally to films and laminates, especially for packaging applications such as the packaging of fresh red meat or other food or non-food products. Particularly, this invention is directed to the packaging of food products such that the packaged product may be maintained in one condition under certain circumstances and then converted to another condition. Specifically, packages in accordance with the present invention provide for distribution of a packaged product in a low oxygen environment and for introduction of oxygen to the product surface at a supermarket or other retail outlet. Such introduction of oxygen is achieved either by permeation of oxygen through a film in contact with the product surface or through an exchange of atmospheric oxygen with a low oxygen gaseous atmosphere contained around the product.

While a wide variety of food products can be packaged in accordance with the teachings of this invention, it is particularly advantageous in connection with the packaging of fresh red meat such that the meat may be transported in a low oxygen atmosphere, that is, preferably 0.5% $O_2$ or less, most preferably 0.05% $O_2$ or less, and then caused to bloom to a bright red color when it is displayed as a retail package by exposure to oxygen.

Historically, large sub-primal cuts of meat have been butchered and packaged in each supermarket. This, however, can be inefficient and result in certain undesirable additional costs. For example, all cuts from a large sub-primal must be sold at once. Instead it would be preferable to permit the meat to be butchered and packaged at a central facility which benefits from economies of scale and thereafter shipped to individual supermarkets such as is done, for example, with many poultry products.

In the past, the goal of central fresh red meat processing has not been achievable because most consumers prefer to buy meat which is reddened in color as a result of exposure to oxygen. However, the meat maintains its reddened color for only about one to three days and, thereafter, turns a brown color which is undesirable to most consumers. Therefore, if the meat was butchered and packaged in a gas permeable (sometimes hereinafter "permeable") film, as is typical at retail, at a central location and then shipped to another location for eventual sale, in all likelihood, by the time the package reached the retail outlet the meat would have undergone the transformation to the brown color and would be effectively unsalable.

Another problem associated with the use of a high oxygen environment is that the package must contain a certain amount of atmosphere (high oxygen), resulting in a tray that is only partially filled.

An alternative would be to butcher and package the meat at a central location in a gas-impermeable (sometimes hereinafter "impermeable") film, either under vacuum or with vacuum and a low oxygen gas flush, and then ship the package under refrigerated conditions (28° F. to 45° F.) to another location for eventual sale. The packaged meat would reach the retail outlet having a purple color which is typical of meat prior to exposure to oxygen. Although this purple fresh meat is very fresh, marketing efforts to teach the consumer about the harmlessness of the purple color have proved to be difficult. In addition, if gas impermeable film was a component of a conventional package having a tray which is overwrapped or lidded with a film and which contains a low oxygen atmosphere (which would be likely in this type of package), the impermeable film would have to be removed at retail and replaced with a permeable film in order to allow for bloom of the meat to a bright red color prior to display for the consumer. This repackaging would of course largely negate the benefits of a central processing facility.

A variety of packages have been developed in an effort to provide a means for transporting meat in a low oxygen environment and for quickly and easily introducing oxygen to the meat at the retail outlet immediately prior to display to the consumer.

One approach to solving this problem has involved the development of peelable films. That is, films have been developed which readily delaminate into permeable and impermeable portions. Such a film is sealed to a support member, such as a tray, which contains the meat product, thereby forming a gas impermeable package for distribution. At the retail outlet, the gas impermeable portions are peeled from the film leaving a permeable film sealed to the tray and, therefore, a gas permeable package which allows the meat to bloom to bright red because of the exchange with atmospheric oxygen. An example of this approach is disclosed in U.S. Patent Application Serial No. 08/531,355 (Kocher et al.), filed Sep. 20, 1995, entitled "Package with Shrink Film Lidstock", assigned to a common assignee with the present application, and incorporated by reference herein in its entirety. A counterpart to the U.S. Ser. No. 08/531,355 application has been published as European Patent Application EP 0721899 Al, published Jul. 17, 1996, and incorporated by reference herein in its entirety. The peelable film may extend over the contained product and be sealed to the periphery of the tray as a lid, or the film can be heated and draped over the product under vacuum to form a vacuum skin package. Other peelable films include those disclosed in U.S. Pat. Nos. 4,886,690 (Davis et al.) and 4,724,185 (Shah), both assigned to a common assignee with the present application, and incorporated by reference herein in their entirety. Another example of a peelable material is that disclosed in U.S. Pat. No. 4,055,672 (Hirsch et al.).

However, a problem associated with these types of packages is the relatively low gas (especially oxygen) transmission rate of the permeable film portion after removal of the impermeable portion. That is, although the permeable portion of the peelable film has a much higher gas transmission rate (typically 5,000 to 25,000 cc/m²/24 hrs./atm. at 73° F.) than that of the entire film prior to delamination (typically 0 to 50 cc/m²/24 hrs./atm. at 73° F.), the transmission rate of the permeable film portion is still too low to effect rapid bloom of the packaged meat in a low oxygen gaseous atmosphere, except in areas of intimate contact between the permeable film and the meat. Thus, the retailer is forced to either wait a relatively long period of time for the peeled packages to bloom, or to display packages that for some time after the beginning of display will still have an undesirable purple meat color.

Most of the other approaches to achieving the goal of central fresh red meat processing have involved the development of a variety of dual web packages of the type having a permeable film covering the meat product and an impermeable film, which is removed at the retail outlet, covering the permeable film wherein the permeable film and the impermeable film are separate, discrete films. Exemplary of these are U.S. Pat. Nos. 4,840,271 (Garwood) and 5,348,752 (Gorlich).

Examples of these types of packages include dual overwrap packages wherein a permeable film is wrapped around the meat and its support member and an impermeable film is wrapped about the permeable film; dual lid packages which include a permeable lid and an impermeable lid sealed to the periphery of the support member; and packages with a head space which allows for the introduction of a treating gas, typically nitrogen, carbon dioxide or some mixture of the two, between a permeable film adjacent to the meat product and an impermeable upper web. But, as is the case with the peelable films discussed above, each of these dual web packages are limited in their effectiveness by the permeability of the permeable film. Typical gas transmission rates for commercially available gas permeable films are 5,000 to 25,000 cc/m²/24 hrs./atm. at 73° F. This is generally too low to effect rapid red meat bloom by exchange of the low oxygen gas and/or gases out through the film into the outside environment, and the atmospheric oxygen in through the film into the package interior. These packages also require two individual sealing steps at the perimeter of each web.

A further package developed to allow for central fresh red meat processing includes a gas impermeable upper lid with a valve defined in the lid. The package may include a treating gas between the packaged meat and the upper lid during distribution which is withdrawn through the valve and replaced with an oxygen-rich gas. Although a rapid bloom is possible with this system, it has the disadvantages of requiring trained operators at the retail outlet and relatively expensive equipment to exchange each package thus negating the cost savings of a central processing facility. The presence of the valve has the further disadvantage of creating a package appearance which is different from that which consumers are accustomed to seeing for meat packaging. Further, a gas space between the meat product and the impermeable film is required to maintain a bloomed color which yields an underfilled package appearance.

Yet another package developed to allow for central fresh red meat processing provides for an exchange of gases and rapid introduction of oxygen in which an upper impermeable web covers a lower permeable web which includes unsealed areas in the seal of the permeable web to the tray. However, the intermittent sealed and nonsealed areas are formed by an altered sealing head which comprises a series of sealing "fingers" rather than a conventional, continuous sealing surface. Such a package, however, presents the possibility of purge leaking from the unsealed portions of the seal. Also, purge, or moisture resulting from condensation in the package, can undesirably result in blocking of the unsealed areas. In addition, it is difficult to produce such a package consistently.

Thus, it is desirable to provide a package which allows for central processing of fresh red meat with minimal processing required at retail; which is similar in appearance to that which consumers are accustomed to seeing for meat packaging; which allows for rapid bloom of fresh red meat; and which may be assembled, filled and sealed at a central processing facility on conventional equipment.

One proposed solution is to provide perforations on the permeable portion of a multilayer lidstock or film, in order to increase the overall permeability of the permeable portion of the film. An example of this approach is found in U.S. Patent Application Ser. No. 08/471,065 (Stockley et al.), entitled "Dual Web Package Having Improved Gaseous Exchange", assigned to a common assignee with the present application, and incorporated by reference herein in its entirety. This would increase the rate of gas exchange from the package interior to the outside environment, and from the outside environment to the package interior.

A problem that arises with this approach is the difficulty of partially perforating a multilayer film, such that the impermeable portion remains unaffected in the first part of the package cycle (pre-retail), and the permeable portion includes perforations after peeling. It is a technical challenge to consistently perforate a thin film to meet these criteria. The perforations clearly cannot be through perforations, because this would defeat the object of providing a package with extended shelf life, since oxygen would quickly enter the package. The practitioner could utilize dual webs, in which one of the webs is perforated, but this requires the use of two webs to form the package lidstock.

SUMMARY OF THE INVENTION

The inventor has found that perforations, partial perforations, and other film treatments can be advantageously utilized in connection with the permeable portion of a peelable film, without affecting an impermeable portion of the same film.

In one aspect of the invention, a method of making a peelable film comprises providing a multilayer film; delaminating the film into a first portion and a second portion; treating the second portion to increase its gas permeability; and relaminating the treated second portion to the first portion.

In another aspect of the invention, an apparatus for making a peelable film comprises a means for delaminating a film into a first portion and a second portion; a means for treating the second portion to increase its gas permeability; and a means for relaminating the treated second portion to the first portion.

DEFINITIONS

As used herein, the term "film" refers to a thermoplastic material, generally in sheet or web form, having more than one layer of polymeric or other materials which may be bonded together by any suitable means well known in the art, e.g., coextrusion, extrusion lamination, extrusion coating, conventional lamination, etc. Film is considered to be preferably less than 20 mils thick, more preferably less than 15 mils thick, such as less than 12 mils, 10 mils, 8 mils, 6 mils, 5 mils, 4 mils, 3 mils, 2 mils, and 1 mil thick.

As used herein, the term "layer" refers to a discrete film component which is coextensive with the film and has a substantially uniform composition.

As used herein, the phrase "gas permeable" refers to a film or film portion which admits at least 1,000 cc of gas, such as oxygen, per square meter of film per 24 hour period at 1 atmosphere and at a temperature of 73° F. More preferably, a gas permeable film or film portion admits at least 5,000, even more preferably at least 10,000, such as at least 15,000, 20,000, 25,000, 30,000, 35,000, 40,000, and 50,000, and most preferably at least 100,000 cc of oxygen per square meter per 24 hour period at 1 atmosphere and at a temperature of 73° F. Typical gas transmission rates for permeable film and film portions in accordance with the present invention range from 1,000 to 100,000, preferably 5,000 to 95,000, such as 10,000 to 90,000, 15,000 to 85,000, 20,000 to 80,000, 25,000 to 75,000, 30,000 to 70,000, and 40,000 to 60,000 cc of oxygen per square meter per 24 hour period at 1 atmosphere and at a temperature of 73° F.

As used herein, the phrase "gas impermeable" refers to a film or film portion which admits less than 1000 cc of gas, such as oxygen, per square meter of film per 24 hour period at 1 atmosphere and at a temperature of 73° F. More preferably, a substantially gas impermeable film admits less than about 500, such as less than 300, and less than 100 cc of gas, more preferably still less than about 50 cc, and most preferably less than 25 cc, such as less than 20, less than 15, less than 10, less than 5, and less than 1 cc of gas per square meter per 24 hour period at 1 atmosphere and at a temperature of 73° F.

Oxygen transmission values are determined in accordance with ASTM D-3985.

As used herein, the phrase "product support member" refers to a component of a package on or in which a product is disposed. Meat products are typically disposed in a tray-like package component comprising, e.g., expanded polystyrene sheet material which has been thermoformed into a desired shape, for supporting the meat product. A product support member preferably includes a cavity into which the product is disposed and a peripheral flange which provides a sealing surface for attachment of a lid to the support member to thereby enclose the product within the cavity.

As used herein, the term "bond strength" and the like refers generally to the force with which two adjacent films or film portions, or two adjacent film layers, are connected. Bond strength is measured by the force required to separate two films or film portions or film layers that are connected.

As used herein, the phrase "preferentially delaminates" and the like refers to the tendency of a multilayer film to delaminate at a predetermined layer/layer interface, and/or within a layer, of one of the films or film portions of the film, upon peeling. Preferential delamination is controlled by factors such as, e.g., the structure and chemical nature of the film and the manner in which the film portions or layers are attached.

As used herein, the terms "peel," "peeling," and the like refer to the act of removing or separating one or more film portions or layers from a multilayer film by manually or mechanically grasping and pulling back a film portion or layer or layers along a plane or interface of relatively low bond strength, or within a film portion or layer having relatively weak intra-layer cohesion.

As used herein, the term "peel force" refers to the amount of force, in pounds per inch, required to separate two film portions or layers of a multilayer film, and is measured in accordance with ASTM F904-91.

As used herein, the phrase "sealant film" refers to a film which is conformably bonded to at least one of the exterior surfaces of a product support member. Preferably, the sealant film is bonded to the upper, as opposed to the lower, exterior surface of the support member, and more preferably is bonded to a peripheral upper flange of the support member. Preferably, the sealant film is a substantially gas impermeable film.

As used herein, the phrase "ethylene/alpha-olefin copolymer" designates copolymers of ethylene with one or more comonomers selected from $C_4$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/ butene copolymers available from Union Carbide with a density ranging from about 0.88 to about 0.91 g/cc) and ultra-low density polyethylene (ULDPE, typically used to refer to the ethylene/octene copolymers supplied by Dow). The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homogeneity of the polymers resulting from the polymerization.

BRIEF DESCRIPTION OF THE DRAWINGS

A detailed description of preferred embodiments of the invention follows, with reference to the accompanying drawings, wherein.

DETAILED DESCRIPTION OF THE PREFERRED EMBODIMENTS

The present invention is useful in the production of a multilayer film that can be used as a component in a tray-type package suitable for the central processing of fresh red meat which includes a gas impermeable product support member or tray, a first gas impermeable film portion, and a second film portion sealed to the tray which includes a means defined therein for providing for an exchange of gases into and out of the package. The package most preferably contains a low oxygen gaseous atmosphere such as, for example, a nitrogen/carbon dioxide mix. Thus, removal of the impermeable film portion allows for a release of the low oxygen atmosphere and for introduction of oxygen to the packaged meat product.

The means for exchanging gases defined within the second film portion can be perforations which are exposed upon removal of the impermeable first film portion; a highly permeable film portion which provides an area of exceptionally high gas transmission upon removal of the impermeable first film portion; or partial perforations ("blind holes") which increase the oxygen transmission rate of the second film portion.

Figure 1:
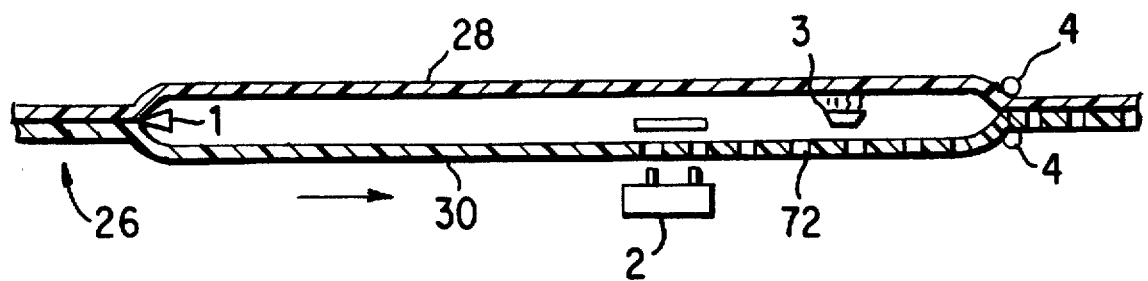
FIG. 1 is a schematic view of the process and apparatus of the invention.

FIG. 1 shows an apparatus comprising a means 1 for delaminating a preferably coextruded film 26 into a first portion 28 and a second portion 30; a means 2 for treating the second portion 28 to increase its gas permeability; and a means 4 for relaminating the treated second portion 30 to the first portion 28.

The means 1 for delaminating a film can include any suitable device or process for delaminating film 26, such as manual delamination, a mechanical delamination device, adhesive tape, or the like. The film will preferentially delaminate at a predetermined, relatively weak layer/layer interface, and/or within a layer, of the multilayer film. In the case of a weak layer/layer interface, this is for example an EVOH/polymeric adhesive interface, where EVOH is ethylene/vinyl alcohol copolymer, and the polymeric adhesive is preferably an anhydride-modified polyolefin.

Another example of such an interface is a polyamide/polymeric adhesive interface, where the polyamide is preferably nylon 6,12 copolymer, nylon 6,66 copolymer, or a blend thereof, and the polymeric adhesive is preferably an anhydride-modified polyolefin.

The film 26 can be made by any suitable process, such as coextrusion, extrusion coating, extrusion lamination, or conventional lamination, although it is preferred that the film is coextruded. Examples of films suitable for delamination are those disclosed in European Patent Application EP 0721899 A1. One example is a multilayer structure A/B/C/D/C/B/A having a formulation generally as follows:

| 25PE1 | 80PA2 | 90 OB | 80PA2 | 25PE1 |
| + /AD/ | + / | + / | + /AD/ | + |
| 75PE2 | 20PA1 | 10 PA1 | 20PA1 | 75PE2 | where:
- PE1=LMDPE, an ethylene/ 1-octene copolymer with a density of 0.935 gm/cc. and an octene-1 comonomer content of 2.5%, available from Dow as Dowlex™ 2037,
- PE2=ethylene/ 1-octene copolymer with a density of 0.920 gm/cc and octene-1 content of 6% by weight, available from Dow as Dowlex™ 2045,
- AD=anhydride-grafted polyolefin in ethylene-butene copolymer, available from DuPont as Bynel™ CXA 4104,
- OB=ethylene/vinyl alcohol copolymer (44 mole % ethylene), available from EVALCA as E-151,
- PA1=nylon 6,12 copolymer, available from EMS as Grilon™F6S, and
- PA2=nylon 6,66 copolymer, available from BASF as Ultramid™C-35.

Another example of a film suitable for delamination is that disclosed in U.S. Pat. No. 4,724,185, and disclosing a multilayer structure A/B/C/B/A having a formulation generally as follows: where the polyolefin is a blend of LLDPE, LMDPE, and EVA (ethylene/vinyl acetate copolymer), and the tie is an anhydride-grafted polyolefin.

The means 2 for treating the second portion 28 can include any suitable device or process for treating the second portion 28 to increase its gas permeability, including perforation or partial perforation by means of any suitable mechanism such as laser, electrostatic (electrical spark), flame, needle, or sharp particles such as shown in U.S. Pat. Nos. 5,257,923 (Kagawa) and 5,352,108 (Kagawa et al.).

Perforations preferably range from about 5 to about 250 microns in diameter, more preferably 25 to 125 microns, and most preferably 75 to 100 microns in diameter. Ideally, the perforations are large enough to permit the passage of atmospheric gas therethrough (oxygen, nitrogen, carbon dioxide), but small enough to prevent the passage of liquids, dirt, or microbes. The perforations may be formed by any suitable means, including the use of mechanical, chemical, or electrical devices. Nonlimiting examples of such devices include those which perforate with a laser, electrostatic discharge, ultrasonic waves, flame discharge, a needle, or combinations thereof. An electrostatic device employs electrostatic discharge by passing the second film portion 30 between a pair of electrodes, and transmitting electricity to one of the electrodes in sufficient voltage that the electrode discharges through the second film portion and to the other electrode, thereby perforating the film.

The means 4 for relaminating the treated second portion 30 to the first portion 28 can include any suitable device or process, such as heated rollers 4, pressure, or both. Whatever the means used, the first and second portions should be relaminated such that they adhere to each other with sufficient adhesion to keep the two portions together during the production of a package from the film 26, yet provide a peelable interface, defining a plane or interface of relatively low bond strength (compared with the remainder of the film) between the two portions when it is desired to remove the first portion, as described in further detail below. It is within the scope of the invention to relaminate the two portions by simply placing the treated second portion into contact with the first portion. However, this is less preferred because of the possibility of the two portions separating from each other during a packaging cycle, and causing wrinkling or other undesirable appearance to the finished package.

In an alternative embodiment, the peelable interface of the relaminated film can differ from the predetermined layer/layer interface of the multilayer film at which the film was originally delaminated, treated, and relaminated. Thus, the film can be delaminated at one delaminatable interface, treated to increase the gas permeability of a second film portion, relaminated at the same interface, used to construct a package, and subsequently peeled at a different peelable interface. An example of this is described herein with respect to the embodiment of FIGS. 4 and 5.

Means 3 is shown as an auxiliary or alternative relaminating means, and can include corona treatment or the application of adhesive, or both, to either or both of portions 28 and 30. As shown in FIG. 1, the inner surface of portion 28 is being corona treated. Corona treatment, adhesives, or both can be used alone, or in conjunction with heat and/or pressure means, such as provided by nip rolls 4. These nip rolls 4 are preferably heated, and preferably exert pressure on the portions 28 and 30.

Thus, any of the aforementioned means, corona treatment, adhesives, heat, and pressure, can be used alone or in any suitable combination to relaminate the first and second film portions together.

EXAMPLE 1

A seven layer film like that described in European Patent Application EP 0721899 A1 was delaminated by applying Scotch® adhesive tape to the two outer surfaces of the film, and pulling the film apart at a polyamide/polymeric adhesive interface into a first impermeable portion and a second permeable portion, then processed along upper and lower rollers. The second permeable portion was micro-perforated by means of an electric spark. The two portions were then relaminated by corona treating one surface of each portion just prior to re-joining the first and second portions, with their respective treated surfaces in contact with each other, at heated nip rollers under pressure.

The now relaminated single web film, with the permeable portion micro-perforated, was sealed along the perimeter flange of barrier foam trays on a Ross 3180 machine, at 255° F., at 80 psi, for 1.0 seconds. The packages were cut, then a corner of film was pulled on each package. The first impermeable portion of the film of each package was removed by peeling at the corner initiation point. The film delaminated cleanly, leaving a second micro-perforated permeable portion as the remaining tray lid.

EXAMPLE 2

A film like that of Example 1 was tested with fresh ground beef in a low oxygen package. A plurality of expanded polystyrene trays, made by W.R. Grace & Co.-Conn., under the designation BT972, were each filled with 1.5 pounds of ground beef, and vacuum/gas flushed to result in sealed packages each containing less than 0.1% oxygen. The packages were kept in dark storage at 35° F. for 14 days. Packages were peeled to allow air to enter, and the meat turned from purple to red in less than 45 minutes. The film peeled acceptably, and the meat was judged acceptable by both subjective (five person panel) and objective (Hunter colorimeter) measurements.

Figure 2:
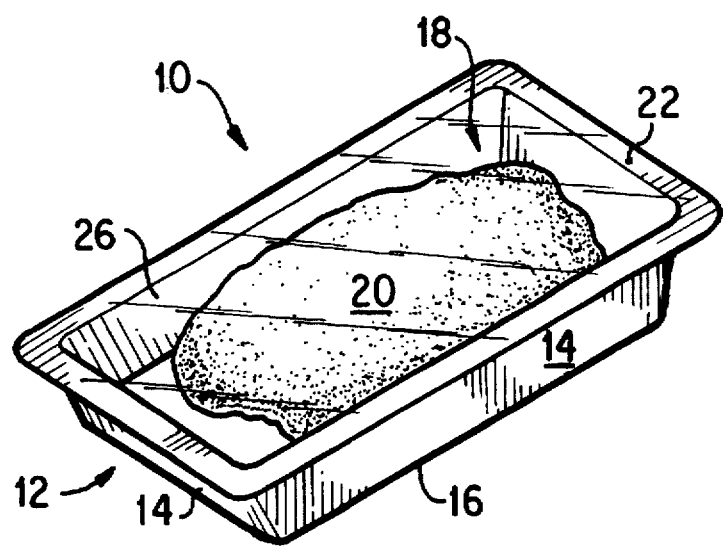
FIG. 2 is a perspective view of a package that can be made utilizing the invention.
Figure 3:
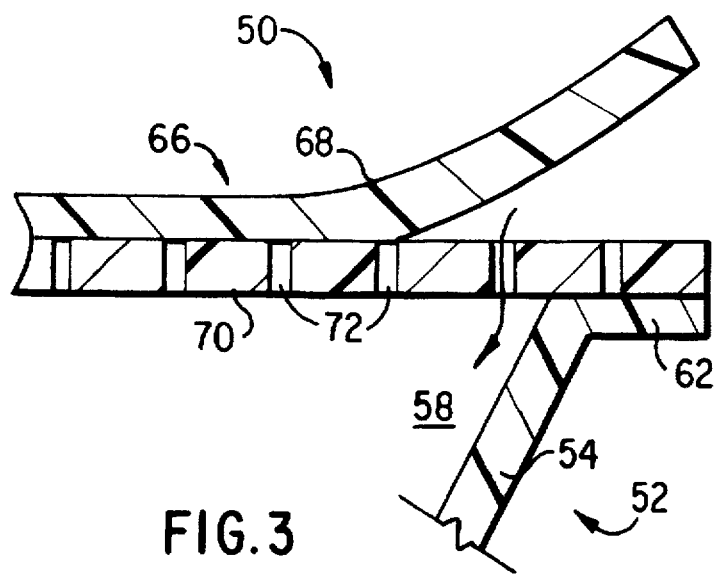
FIGS. 3, 4, and 5 are partial cross-sectional views of a partially peeled multilayer film in accordance with different embodiments of the invention.

Referring to the drawings, FIGS. 2 and 3 illustrate packages with a film lidstock which may be delaminated by peeling a gas impermeable first film portion from a perforated, gas permeable second film portion. Such multilayer films allow for a simplified packaging operation employing conventional single flange trays, a vacuum or, preferably, a vacuum and gas flush with a low oxygen atmosphere, and sealing of a single web to the tray flange in a single sealing step. At retail, the gas impermeable first film portion is peeled away revealing a perforated gas permeable second film portion which has a gas transmission rate of preferably at least about 50,000 cc/m$^2$/24 hrs./atm. at 73° F., allowing for a rapid release of the low oxygen atmosphere and introduction of oxygen for rapid blooming of the packaged meat product.

In FIG. 2, a package 10 made using multilayer film in accordance with the present invention includes a support member or tray 12 having side walls 14 and a base 16 defining an inner cavity 18 for receiving product 20. A peripheral flange 22 is defined about the upper portions of side walls 14. Multilayer film 26 is sealed to the tray at the flange 22.

FIG. 3 is a cross-sectional view of a part of a package 50 like the package 10 of FIG. 2, including tray 52 having side walls 54 and a base, not shown, which defines a cavity 58 for receiving a product. A peripheral flange 62 is defined about the upper portions of side walls 54, with film 66 sealed to flange 62. For the present embodiment, film 66 is a single, coextruded multilayer film which may be peeled into impermeable and permeable portions. Films which may be so peeled are well known in the art, and examples have been given earlier in this description. Such films are formed by e.g. coextruding a multilayer film which includes two layers immediately adjacent to each other which demonstrate a weak force of adhesion therebetween.

Preferred bond strengths equate to peel forces required to separate the permeable and impermeable portions of the film. Peel forces preferably range from about 0.001 to about 2.5 lbs, more preferably 0.01 to 2 lbs, such as 0.05 to 1.5 lbs, and 0.1 to 1 lb. Typically, the peel is initiated through a heat seal at the perimeter flange of the product support member. The peel initiation force will generally be somewhat higher than the peel force. For example, if peel force is about 0.5 lbs/inch, the peel initiation force will typically be between 1.0 and 1.5 lbs/inch. Thus, film 66 delaminates into an upper gas impermeable portion 68 and a lower gas permeable portion 70, as is shown.

Film portion 70 has defined therein perforations 72 which extend through the gas permeable portion 70 of the film. Upon delamination it is seen that the impermeable film portion 68 is substantially free of such perforations. In an alternative embodiment, perforations which extend substantially but not completely through the permeable portion, commonly referred to as blind perforations, can also be used beneficially in connection with the present invention.

Thus, when impermeable portion 68 is peeled away, perforations 72 defined within the remaining permeable portion 70 allow for a rapid exchange of gases and consequent blooming of the packaged meat product.

It is also within the scope of the present invention, although less preferred, to provide a multilayer film which delaminates into two portions, each comprising an inherently impermeable material, with the portion that is directly sealed to the support member having perforations. Such alternative is less preferred because the inherent permeability of a permeable film portion also aids in gas exchange. In areas of intimate film to meat contact, a perforated film portion made from an inherently impermeable material will preclude bloom of the meat except in the specific areas of perforation, thus resulting in a non-bloomed area containing dotted areas of bloom. And, because of the expense involved in coextruding two gas impermeable layers in a single multilayer film, where one layer will subsequently be perforated to render it permeable, it is generally preferred that the perforated portion is made from an inherently permeable material.

Figure 4:
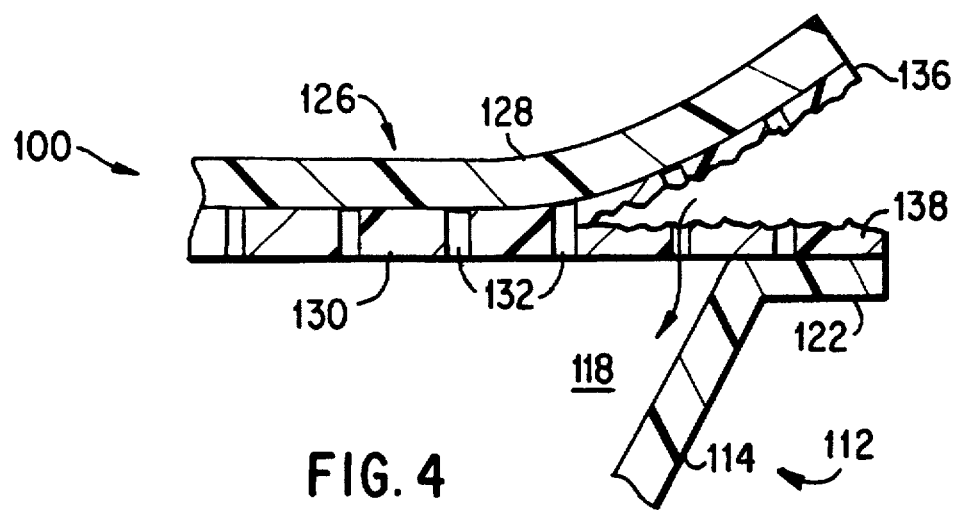
Figure 5:
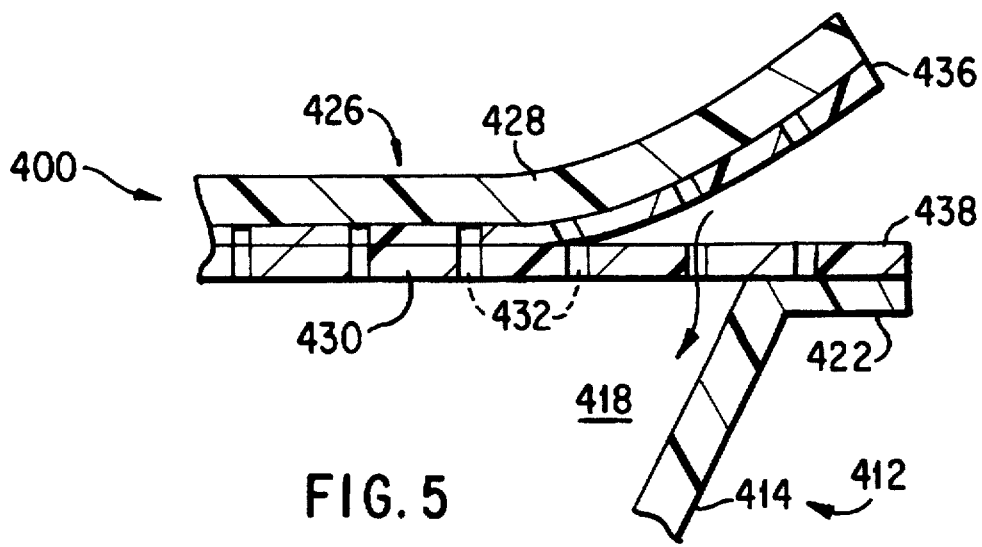

FIGS. 4 and 5 illustrate packages with films which may be delaminated by peeling a gas impermeable first film portion, as well as part of a perforated, gas permeable second film portion, from the remaining part of the second film portion.

FIG. 4 discloses a package 100 in accordance with the present invention which includes a product support member or tray 112 having side walls 114 and a base (not shown) defining an inner cavity 118 for receiving product. A peripheral flange 122 is defined about the upper portions of side walls 114. Multilayer film 126 is sealed to the tray at the flange 122. For the present embodiment, film 126 includes gas impermeable film portion 128 and gas permeable film portion 130 having perforations 132 defined therein. Film portion 130 is capable of delaminating into two separate film components, if the force require to delaminate film portion 130 into two separate film components is less than the force required to delaminate gas impermeable film portion 128 from gas permeable film portion 130.

That is, in accordance with one embodiment of the present invention, film portion 130 was previously delaminated from film portion 128, perforated, and then relaminated to impermeable film portion 128. However, unlike film 66 above, impermeable film portion 128 may not be readily peeled from film portion 130 because a relatively strong interlaminar bond was created between the two portions upon relamination. Thus, the bond strength between film portions 128 and 130 is greater than the intralayer or cohesive strength of film portion 130 such that any attempt to remove film portion 128 results in the cohesive failure and/or intralayer delamination of film portion 130 into two separate components. Upper component 136 remains bonded to impermeable film 128, and lower component 138 remains sealed to tray flange 122.

FIG. 5 discloses a package 400 in accordance with the present invention which includes a product support member or tray 412 having side walls 414 and a base (not shown) defining an inner cavity 418 for receiving product. A peripheral flange 422 is defined about the upper portions of side walls 414. Multilayer film 426 is sealed to the tray at the flange 422. For the present embodiment, film 426 includes gas impermeable film portion 428 and multilayer gas permeable film portion 430 having perforations 432 defined therein. Film portion 430 is capable of delaminating into two separate film components, if the force required to delaminate film portion 430 into two separate film components is less than the force required to delaminate gas impermeable film portion 428 from gas permeable film portion 430.

That is, in accordance with one embodiment of the present invention, film portion 430 was previously delaminated from film portion 428, perforated, and then relaminated to impermeable film portion 428. However, unlike film 66 above, impermeable film portion 428 may not be readily peeled from film portion 430 because a relatively strong interlaminar bond was created between the two portions upon relamination. Thus, the bond strength between film portions 428 and 430 is greater than the interlayer bond strength of film portion 430 such that any attempt to remove film portion 428 results in the interlayer delamination of film portion 430 into two separate layers 436 and 438. Thus, upper layer 436 remains bonded to impermeable film portion 428, and lower layer 438 remains sealed to tray flange 422.

The second film portion of the present invention is preferably an oxygen permeable material. Typical polymeric materials for the present permeable film can include any material which can be sealed to the support member, such as polyolefin, especially propylene homopolymer or copolymer, or polyethylene, or any of a variety of ethylene copolymers including, for example, ethylene/vinyl acetate copolymer, ethylene/ acrylate copolymer, ethylene/acrylic acid copolymer including metal neutralized salt thereof, and ethylene/alpha-olefin copolymer. A wide variety of permeable structures can be employed.

The first impermeable film portion of the present invention can be any suitable barrier layer, film or laminate which is substantially impermeable to gas such as oxygen so that a fresh meat product contained in a vacuum or other low oxygen atmosphere possesses an enhanced shelf life over a package without the barrier layer. Suitable polymeric materials having gas barrier properties for use in the present invention include ethylene/vinyl alcohol copolymer, vinylidene chloride copolymer (PVDC) such as vinylidene chloride/vinyl chloride or vinylidene chloride/methyl acrylate copolymer, polyamide or copolyamide, or polyester or copolyester. An impermeable portion can have the structure:

PVDC /PET

A wide variety of film structures can be employed as the impermeable portion of the present invention.

The film employed will most likely contain three layers at a minimum: a seal layer, a barrier layer and an outer abuse layer. Further internal layers such as adhesive layers and bulk layers can also be included. Laminates of sealable films and nonforming materials such as biaxially oriented polyester or biaxially oriented nylon are also within the scope of the present invention. Such laminates can be produced by corona treatment or any other suitable process.

For all embodiments, the product support member should be impermeable, but may be chosen from a variety of commercially available designs and compositions. That is, the product support member may be formed of a rigid solid polymer, a barrier sealant coated polymer, a barrier sealant coated foamed polymer, or a barrier sealant coated pulp or paperboard tray. If foamed, a barrier film must be included, at least, on the inner surface of the tray in order to prevent outgassing of residual gases into the package. The barrier sealant film for the tray can be e.g. that disclosed in European Patent Publication 0 707 955 A1 published Apr. 24, 1996, incorporated by reference herein in its entirety.

It is intended that the scope of the invention be defined by the claims appended hereto, and their equivalents.

What is claimed is:

1. A method of making a peelable film comprising:
   a) providing a multilayer thermoplastic film;
   b) delaminating the film along a first interface into a first gas impermeable portion having a permeability of less than 1000 cc of gas per square meter of film per 24 hour period at 1 atmosphere and at a temperature of 73° F., and a second gas permeable portion having a permeability of at least 1000 cc of gas per square meter of film per 24 hour period at 1 atmosphere and at a temperature of 73° F.
   c) perforating the second portion to increase its gas permeability; and
   d) relaminating the perforated second portion to the first portion along the first interface.

2. The method of claim 1 wherein the peelable film, after the step of relaminating the perforated second portion to the first portion, comprises a first layer, and a second layer, the first and second layers adjacent each other and forming a peelable interlaminar interface between the adjacent layers.

3. The method of claim 2 wherein the first adjacent layer comprises a polyethylene homopolymer or copolymer, and the second adjacent layer comprises a material selected from the group consisting of polyamide, copolyamide, polyester, copolyester, propylene homopolymer, and propylene copolymer.

4. The method of claim 1 wherein the first portion and second portion are relaminated together by corona treating a surface of the first portion, and bringing the corona treated surface of the first portion into contact with the second portion.

5. The method of claim 1 wherein the first portion and second portion are relaminated together by corona treating a surface of the second portion, and bringing the corona treated surface of the second portion into contact with the first portion.

6. The method of claim 1 wherein the first portion and second portion are relaminated by heat sealing the first and second portions together.

7. The method of claim 6 wherein the first and second portions are heat sealed together under pressure.

8. The method of claim 1 wherein the first portion and second portion are relaminated by ultrasonically sealing the first and second portions together.

* * * * *